UNITED STATES PATENT OFFICE.

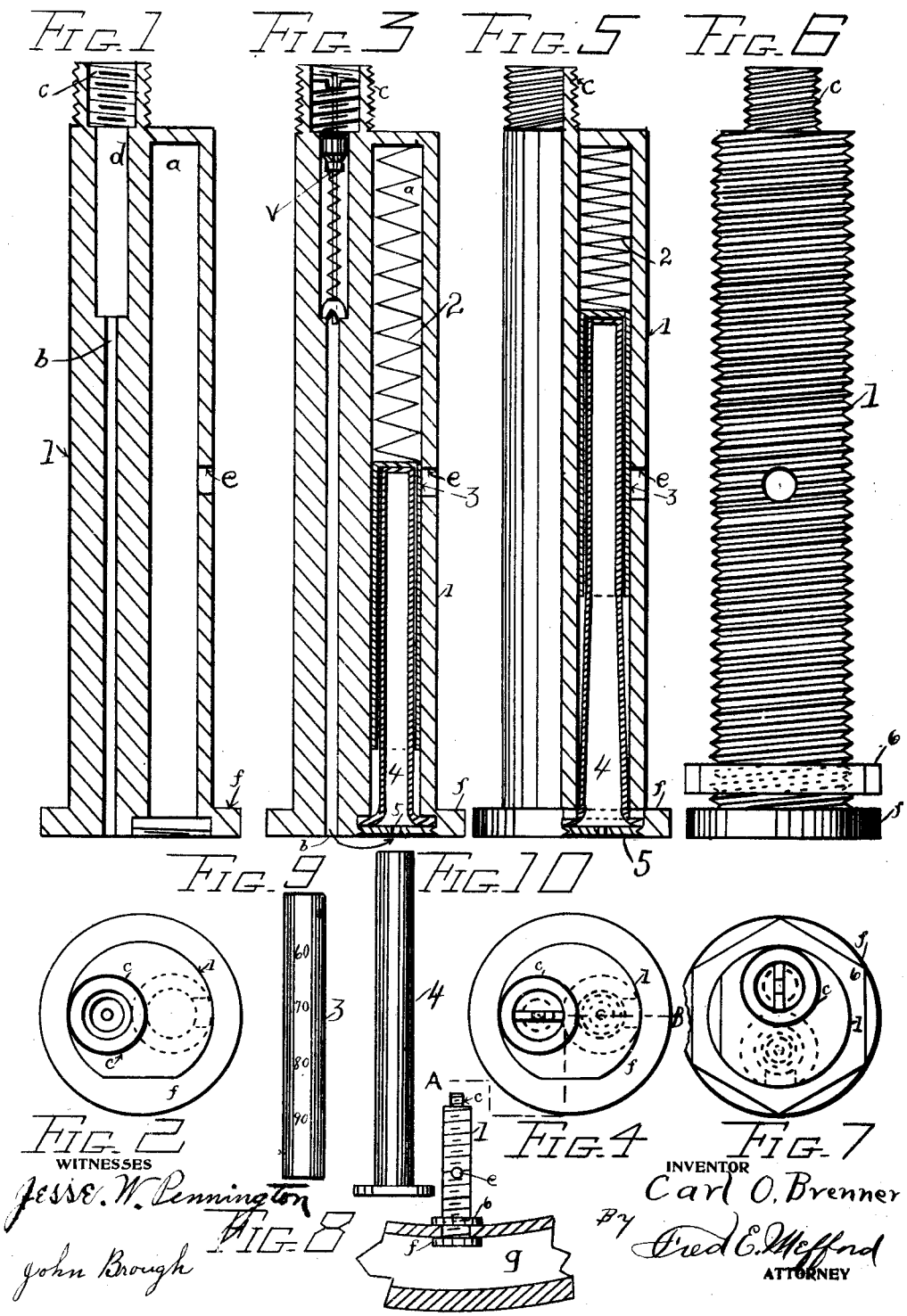

CARL O. BRENNER, OF DESCANSO, CALIFORNIA

AIR-PRESSURE INDICATOR FOR PNEUMATIC TIRES.

1,119,236.  Specification of Letters Patent.  Patented Dec. 1, 1914.

Application filed June 2, 1914. Serial No. 842,356.

*To all whom it may concern:*

Be it known that I, CARL O. BRENNER, a citizen of the United States, residing at Descanso, in the county of San Diego and State of California, have invented a new and useful Air-Pressure Indicator for Pneumatic Tires, of which the following is a specification.

My invention relates to air pressure indicators which are permanently secured to pneumatic tires for the purpose of ascertaining the air pressure therein; and the objects of my invention are to provide in one piece a housing for the interior members of the indicator and an ordinary air valve, so that but one hole will be necessary in the rim of the wheel on which the tire is used; and to provide the indicator therein.

I attain these and other objects by the device illustrated in the accompanying drawings which are drawn to an enlarged scale with the exception of Figure 8.

Similar reference characters refer to like parts throughout the several views.

Fig. 1 is an elevation of a cross section through the center of the housing 1; Fig. 2 a plan view of the housing 1; Fig. 3 an elevation of a cross section of the assembled device, through the center; Fig. 4 is a plan view of the device assembled; Fig. 5 is a cross section of the assembled device taken on the line A—B of Fig. 4, showing the nipple 4 elongated, the thimble 3 raised, and the spring 2 compressed; Fig. 6 is an elevation of the device at right angles to the preceding views, showing the housing threaded to hold the nut 6; Fig. 7 is a plan view of Fig. 6; the flange being partly broken away; Fig. 8 is a fragmentary view of the tire $g$ and the device secured thereon, partly in section, drawn to a reduced scale; Fig. 9 is an elevation of the circular thimble 3; Fig. 10 is an elevation of the elastic nipple 4.

The parts are assembled as follows: An ordinary air valve is disposed within the recess $d$ in the housing 1; a spring 2 is disposed in the upper end of the chamber $a$, a graduated thimble 3 is disposed beneath said spring, a rubber nipple 4 is disposed beneath said thimble and secured air tight at the bottom by a plug 5 which has a small hole in the center thereof.

When attached to a tire $g$ as shown in Fig. 8 the device is operated as follows:

The connection of an air pump is attached to the tubular extension $c$ on the housing 1; the air is admitted through the valve $r$ and enters the tire through the hole $b$; from the tire the air enters the nipple 4 through the small hole in the plug 5; the pressure of the air elongates the nipple and pushes the thimble upward against the spring 2 thereby compressing it as shown in Fig. 5. The spring being of the proper resistance and the graduations on the thimble 3 being correspondingly calibrated, the reading is seen through the hole $e$. The readings are in pounds per square inch but any other convenient unit may be used.

By the use of my device the amount of pressure can be ascertained during the operation of inflation without removing the pump connection. When out on the road or at any other time the pressure can be ascertained by simply looking through the hole $e$. This device cannot be lost or mislaid since it is a permanent fixture of the tire.

The maximum amount of service of a tire can only be secured by having the proper amount of air in the tire at all times. By the use of my device this proper amount can be put into the tire without guess work and the decreased pressure due to leaking can be detected by looking at the indicator. More than one hole in the rim of the wheel weakens it but by the use of my device only one hole is necessary in the rim or in the tire for both valve stem and indicator.

Having described my invention what I desire to secure by Letters Patent is—

1. A device of the class described comprising a cylinder having a longitudinally bored chamber therein; a spring disposed at the closed end thereof; an index member disposed against said spring; a plunger member disposed against said index member; an aperture in the side of said cylinder opening on said index member; a plug having an aperture therein, disposed at the mouth of said chamber; a longitudinal hole extending through said cylinder parallel with said chamber; and an air valve disposed at the upper end of said hole for the purposes specified.

2. A device of the class described comprising a cylinder having an outwardly extended flange at the base thereof; a longitudinally bored chamber having an opening in the side thereof, a spring disposed at the upper end thereof, a tube closed at the upper end having the lower edge firmly secured by a threaded plug; a graduated thimble disposed between said spring and said elastic tube; a hole parallel to said chamber extending through said cylinder eccentrically therewith; and an air valve disposed within said hole; substantially as described and for the purposes set forth.

CARL O. BRENNER.

Witnesses:
H. H. HIMEBAUGH,
JOEL C. JOHNSON.